(12) United States Patent
Kim

(10) Patent No.: US 11,741,620 B1
(45) Date of Patent: Aug. 29, 2023

(54) PLANE DETECTION USING DEPTH SENSOR AND SEMANTIC INFORMATION

(71) Applicant: Apple Inc., Cupertino, CA (US)

(72) Inventor: Seongdo Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 17/152,900

(22) Filed: Jan. 20, 2021

Related U.S. Application Data

(60) Provisional application No. 62/965,226, filed on Jan. 24, 2020.

(51) Int. Cl.
  *G06K 9/00* (2022.01)
  *G06T 7/50* (2017.01)

(52) U.S. Cl.
  CPC ...... *G06T 7/50* (2017.01); *G06T 2207/10028* (2013.01)

(58) Field of Classification Search
  CPC .................. G06T 7/50; G06T 2207/10028
  See application file for complete search history.

(56) References Cited

U.S. PATENT DOCUMENTS

| | | | |
|---|---|---|---|
| 8,265,425 B2 | 9/2012 | Ng-Thow-Hing et al. | |
| 9,117,310 B2* | 8/2015 | Coene | G06T 7/194 |
| 9,965,865 B1* | 5/2018 | Agrawal | G06V 10/7747 |
| 10,108,867 B1* | 10/2018 | Vallespi-Gonzalez | G06V 20/58 |
| 10,169,680 B1* | 1/2019 | Sachdeva | G06N 3/045 |
| 10,872,269 B2* | 12/2020 | Roy Chowdhury | G05D 1/0088 |
| 10,937,178 B1* | 3/2021 | Srinivasan | G06T 7/521 |
| 2013/0282208 A1* | 10/2013 | Mendez-Rodriguez | G01S 17/933 701/16 |
| 2017/0039731 A1* | 2/2017 | Liu | G06T 7/60 |
| 2017/0330054 A1* | 11/2017 | Fu | G06V 10/82 |
| 2018/0066934 A1 | 3/2018 | Nakazato et al. | |

(Continued)

FOREIGN PATENT DOCUMENTS

| CA | 2812117 A1 * | 3/2012 | G06K 9/00221 |
|---|---|---|---|
| CN | 105139416 A * | 12/2015 | |

(Continued)

OTHER PUBLICATIONS

Automatic Object Segementation—Similarity, Hamdi Yalin Yalic et al., VISAPP, 2018, pp. 379-386 (Year: 2018).*

(Continued)

*Primary Examiner* — Jayesh A Patel
(74) *Attorney, Agent, or Firm* — Thompson Hine LLP

(57) ABSTRACT

Various implementations disclosed herein include devices, systems, and methods that detect planar regions using depth points from multiple depth sensors (e.g., a sparse array of depth sensors). In some implementations, depth points are obtained from depth sensors, the depth points corresponding to distances of portions of a physical environment from the depth sensors. In some implementations, a subset of the depth points corresponding to a planar region are identified based on positions of the depth sensors corresponding to the depth points of the subset. In some implementations, the planar region is expanded to include an additional depth point or an additional planar region based on expansion criteria, wherein the expansion criteria require that the additional depth point or additional planar region be within a predetermined distance of the planar region.

20 Claims, 11 Drawing Sheets

(56) References Cited

U.S. PATENT DOCUMENTS

| | | | | |
|---|---|---|---|---|
| 2018/0181803 A1* | 6/2018 | Zhang | .................... | G06V 20/53 |
| 2018/0364717 A1* | 12/2018 | Douillard | ................ | G01S 17/58 |
| 2019/0206135 A1* | 7/2019 | Jiang | ........................ | G06F 3/017 |
| 2019/0279380 A1 | 9/2019 | Bendall | | |
| 2019/0362500 A1* | 11/2019 | Takeda | .................... | G06T 7/194 |
| 2021/0188312 A1* | 6/2021 | Shikari | .............. | B60W 40/076 |

FOREIGN PATENT DOCUMENTS

| | | | | |
|---|---|---|---|---|
| CN | 110135278 A | * | 8/2019 | |
| CN | 110596664 A | * | 12/2019 | .............. G01S 7/40 |
| EP | 2652688 A2 | * | 8/2012 | |

OTHER PUBLICATIONS

Classifying Urban Landscape in Aerial Lidar Using 3D Shape Analysis, Matthew Calrberg et al., IEEE, 2009, pp. 1701-1704 (Year: 2009).*

PointSeg: Real-Time Semantic Segmentation Based on 3D LiDAR Point Cloud, Yuan Wang et al., arXiv, 2018, pp. 1-7 (Year: 2018).*

Planar object detection from 3D point clouds based on pyramid voxel representation, Zhaozheng Hu et al., Springer, 2017, pp. 24343-24357 (Year: 2017).*

Fast Plane Extraction in 3D Range Data Based on Line Segments, Kristiyan Georgiev et al., IEEE, 2011, pp. 3808-3815 (Year: 2011).*

Fast Cylinder and Plane Extraction from Depth Cameras for Visual Odometry, Pedro F. Proença et al., IEEE, 2018, pp. 6813-6820 (Year: 2018).*

Piecewise planar scene reconstruction from sparse correspondences, Friedrich Fraundorfer et al., Elsevier, 2006, pp. 395-406 (Year: 2006).*

Fast plane segmentation with line primitives for RGB-D sensor, Lizhi Zhang et al., IJOARS, 2016, pp. 1-8 (Year: 2016).*

Planar 3D Modeling of Building Interiors From Point Cloud Data, Victor Sanchez et al., ICIP, 2012, pp. 1777-1780 (Year: 2012).*

Yalic, Hamdi Yalin; Can, Ahmet Burak, "Automatic Object Segmentation on RGB-D Data using Surface Normals and Region Similarity", Proceedings of the 13th International Joint Conference on Computer Vision, Imaging and Computer Graphics Theory and Applications(VSIGRAPP 2018)—vol. 4:VISAPP, pp. 379-386; 2018.

Holz, Dirk; Holzer, Stefan, Rusu, Radu Bogdan and Behnke, Sven, "Real-Time Plane Segmentation using RGB-D Cameras", Jan. 2012, Lecture Notes in Computer Science, 7416, pp. 1-12.

* cited by examiner

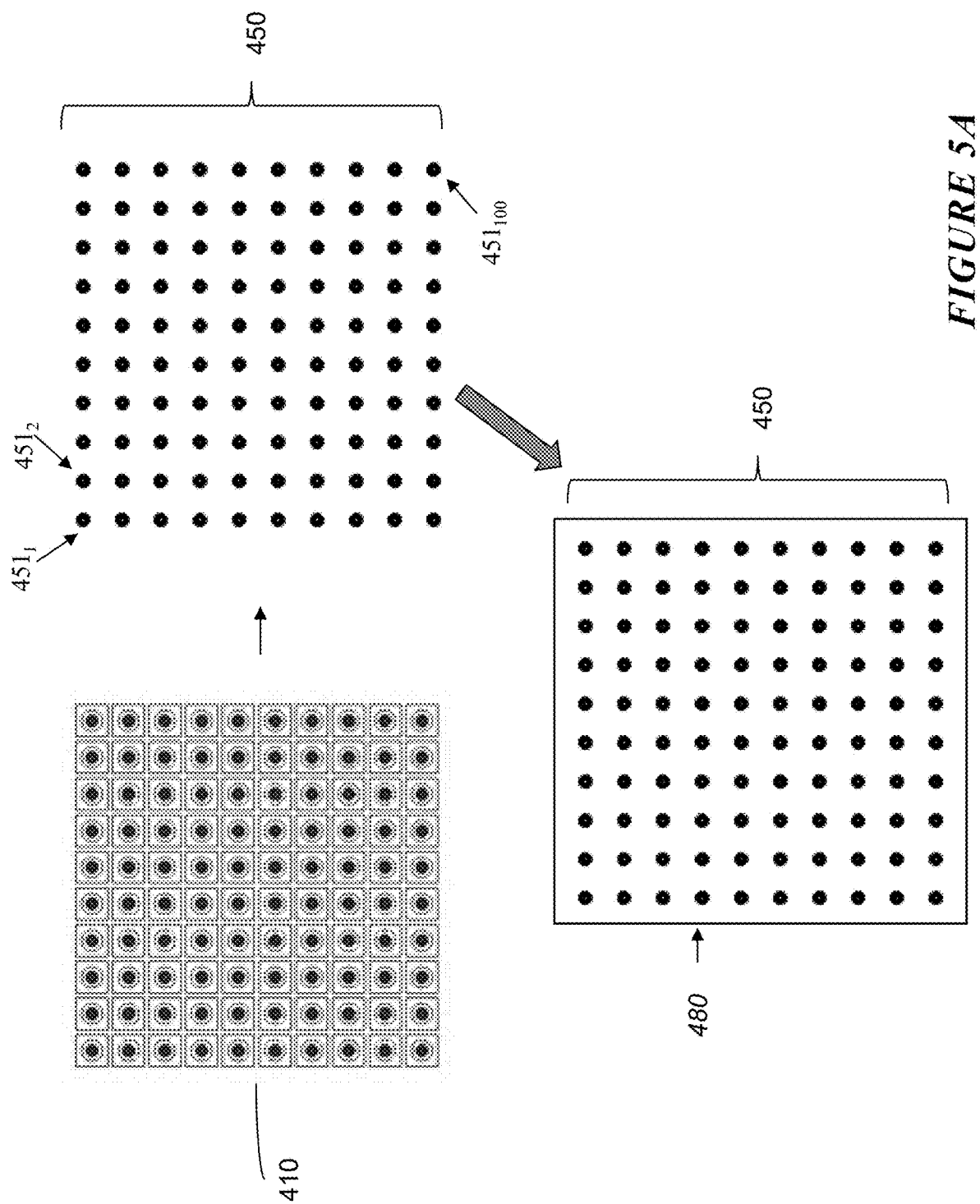

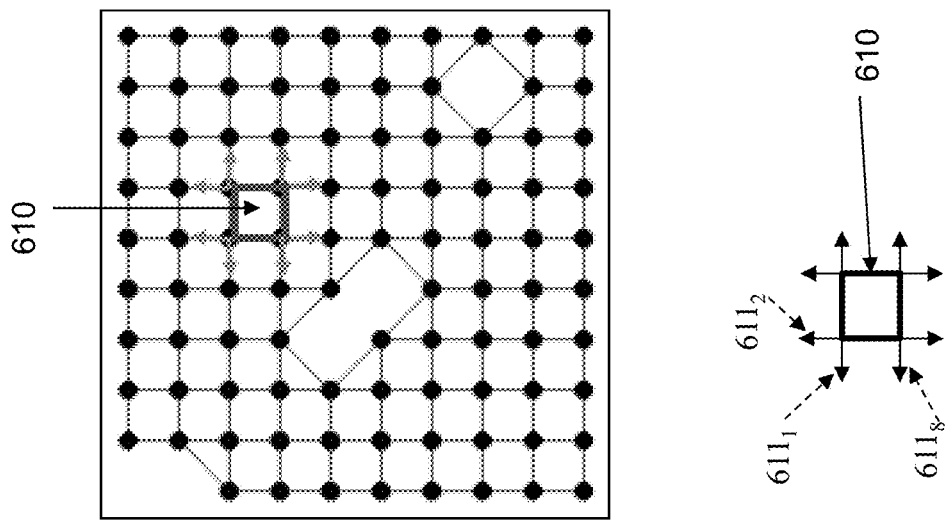

```
1: procedure COMPUTEINLIERS(G, Π_k)
Input: A point grid G and a model Π_k = (π_k, s_k, r_k)
Output: I_k, a set of computed inliers
2:   Initialize a queue Q by adding s_k
3:   while |Q| ≠ ∅ do
4:     Pop a point p from Q
5:     for each valid and unvisited point p_j in 4-NN of p do
6:       if dist(π_k, P_j) ≤ r_k then
7:         Add p_j to I_k and Q
8:       end if
9:     end for
10:  end while
11: end procedure
``` where $s_k$ is seed points used to compute the model, and $P_j$ is the corresponding 3D point of $p_j$.

*FIGURE 6A*

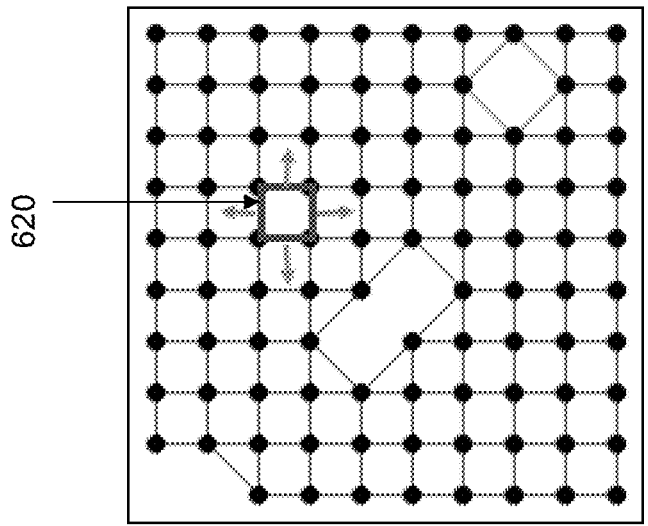
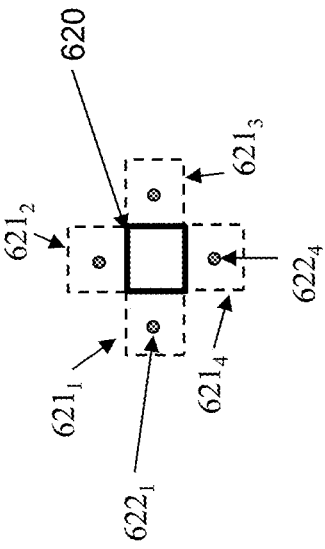

1: procedure COMPUTEINLIERS($\mathcal{G}, \Pi_k$)
   Input: A point grid $\mathcal{G}$ and a model $\Pi_k = \{\pi_k, s_k, \tau_k\}$
   Output: $\mathcal{I}_k$, a set of computed inliers
2:    $\mathcal{C}_k := \emptyset$
3:    Initialize a queue $\mathcal{Q}$ by adding a cell consisting of $s_k$.
4:    while $|\mathcal{Q}| \neq \emptyset$ do
5:        Pop a cell $\mathcal{C}_i$ from $\mathcal{Q}$
6:        for each valid and unvisited cell $\mathcal{C}_j$ in 4-NN of $\mathcal{C}_i$ do
7:            if $\text{dist}(\pi_k, P_j) \leq \tau_k, \forall P_j \in \mathcal{C}_j$ and $|n_k \cdot n_j| \leq \tau_\theta$ then
8:                Add $\mathcal{C}_j$ to $\mathcal{C}_k$ and $\mathcal{Q}$
9:            end if
10:       end for
11:   end while
12:   Add all the points belonging to $\mathcal{C}_k$ to $\mathcal{I}_k$.
13: end procedure where $n_j$ is the normal of a cell $\mathcal{C}_j$.

*FIGURE 6B*

PLANE DETECTION USING DEPTH SENSOR AND SEMANTIC INFORMATION

CROSS-REFERENCE TO RELATED APPLICATIONS

This Application claims the benefit of U.S. Provisional Application Ser. No. 62/965,226 filed Jan. 24, 2020, which is incorporated herein in its entirety.

TECHNICAL FIELD

The present disclosure generally relates to computer vision, and in particular, to systems, methods, and devices for implementing computer vision techniques that provide plane estimation in physical environment (e.g., scene) understanding.

BACKGROUND

Various computer-based techniques are used to identify the locations of planar regions based on one or more images of a physical environment. For example, simultaneous localization and mapping (SLAM) techniques can provide 3D point locations based on matching texture (or other features) in images of a physical environment and these 3D points can be used to predict the location of floors, table surfaces, walls, ceilings, and other planar regions. However, because of the randomness of estimated planar regions in 3D point clouds generated by SLAM and similar techniques, the planar regions are often inadequate. The planar regions that are predicted are often relatively small, do not include the full extent of a planar region or its planar extents (e.g., boundaries), or require camera images from a variety of locations and positions in the physical environment. Existing techniques often fail to identify some of the planar regions in a physical environment, sufficiently large planar regions, or planar region extends that would be useful or are required for many applications.

SUMMARY

Various implementations disclosed herein include devices, systems, and methods that obtain depth points from a physical environment using multiple depth sensors (e.g., a sparse configuration of depth sensors) to identify a planar region that includes a subset of the depth points based on the depth points being from neighboring depth sensors. For example, the depth points correspond to distances of portions of the physical environment from the multiple depth sensors. In some implementations, the multiple depth sensors are positioned in a known configuration relative to one another. In some implementations, the known configuration of the multiple depth sensors is a regularly spaced 2D grid (e.g., 10×10 array of 100 depth sensors). In some implementations, the identified planar region is expanded to include additional neighboring depth points or additional neighboring planar regions based on criteria (e.g., distance or normal criteria). In some implementations, the identified planar region is expanded to include additional neighboring depth points or additional neighboring planar regions based on point-wise planar region growing techniques. In some implementations, the identified planar region is expanded to include additional neighboring depth points or additional neighboring planar regions based on cell-wise planar region growing techniques. In some implementations, the expanded planar region is altered (e.g., enlarged, reduced, or divided) based on corresponding semantic data from image data of the physical environment that corresponds to the expanded planar region. In some implementations, the expanded planar region is altered based on the corresponding semantic data from at least one image sensor co-located to the multiple depth sensors on an electronic device.

In some implementations, the expanded planar region is further refined based on additional depth points (e.g., second set of depth points, later in time) from the multiple depth sensors that correspond to additional distances to the physical environment from the multiple depth sensors. In some implementations, the expanded planar region may be refined based on additional semantic information obtained from the corresponding image sensor at the same or similar time as the additional depth points.

Various implementations disclosed herein include devices, systems, and methods that detect planar regions using depth points from multiple depth sensors (e.g., a sparse array of depth sensors). In some implementations, depth points are obtained from depth sensors, the depth points corresponding to distances of portions of a physical environment from the depth sensors. In some implementations, a subset of the depth points corresponding to a planar region are identified based on positions of the depth sensors corresponding to the depth points of the subset. In some implementations, the planar region is expanded to include an additional depth point or an additional planar region based on expansion criteria, wherein the expansion criteria require that the additional depth point or additional planar region be within a predetermined distance of the planar region.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5A is a block diagram illustrating a sparse depth sensor array capturing distances to portions of a physical environment to produce a 2D arrangement of depth measurements that corresponds to the physical arrangement of the multiple depth sensors in the sparse depth sensor array in accordance with some implementations.

FIG. 6A is a diagram that shows an example point-wise growing of a candidate planar region in accordance with some implementations.

FIG. 6B is a diagram that shows an example cell-wise growing of a candidate planar region in accordance with some implementations.

Figure 1:
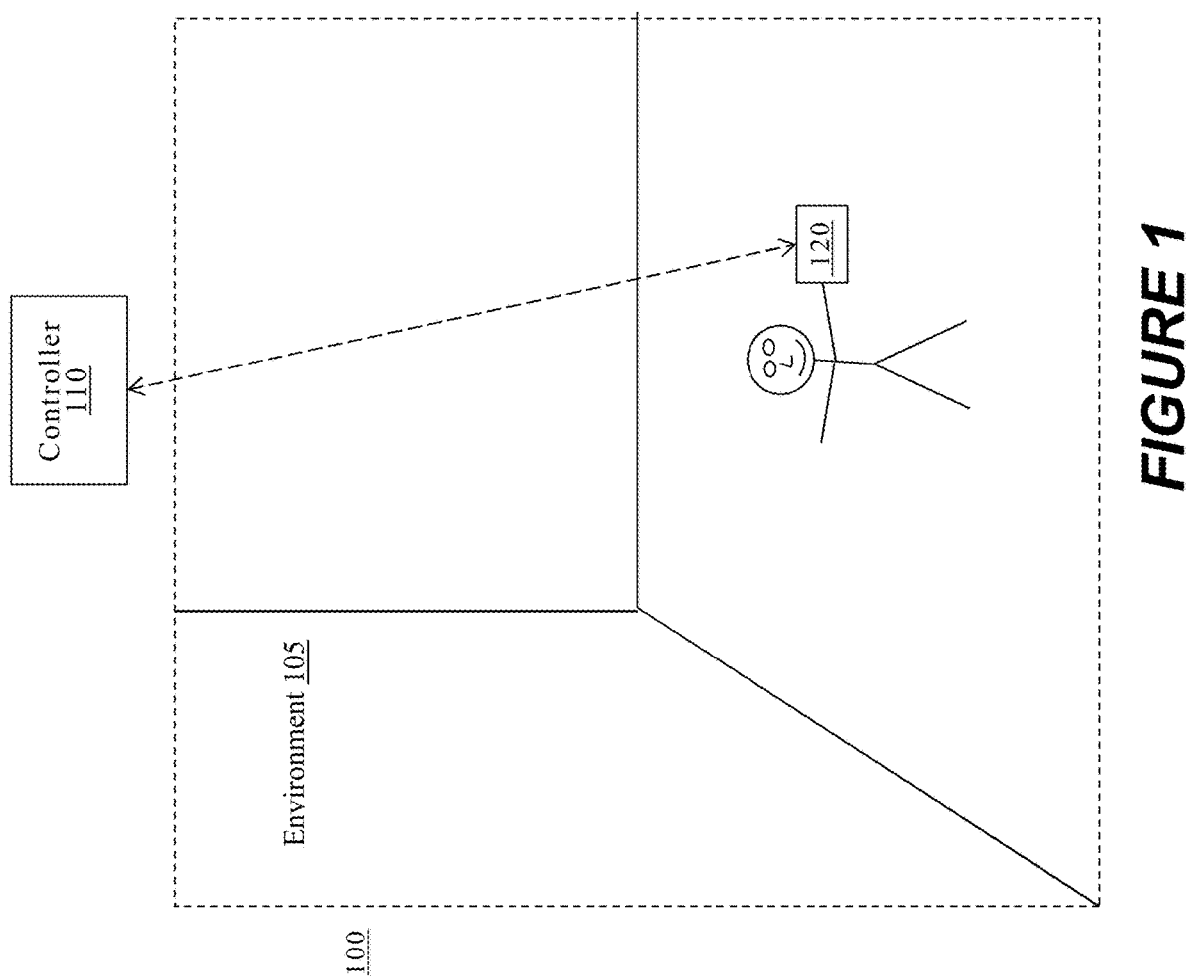
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
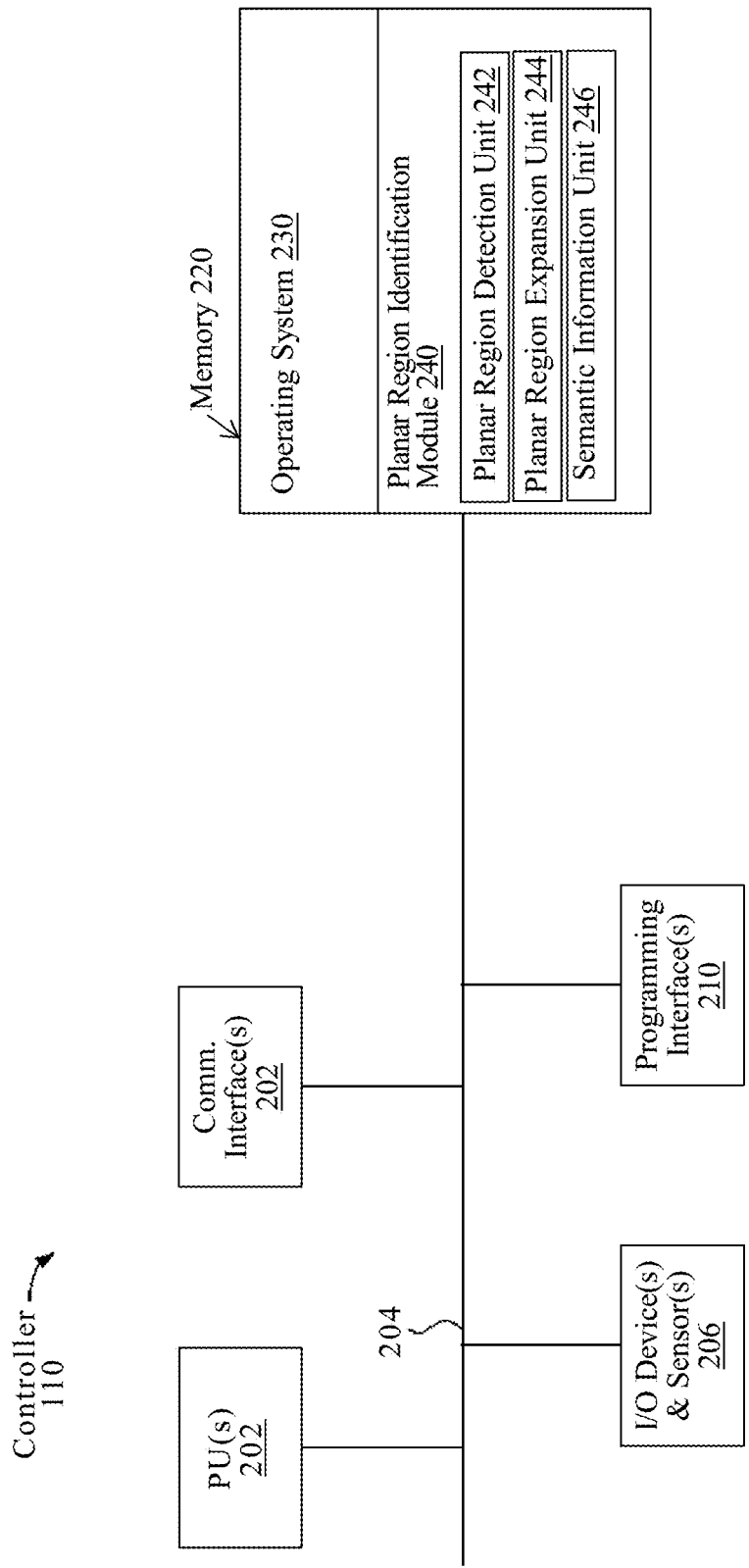
FIG. 2 is a block diagram of an example controller in accordance with some implementations.
Figure 3:
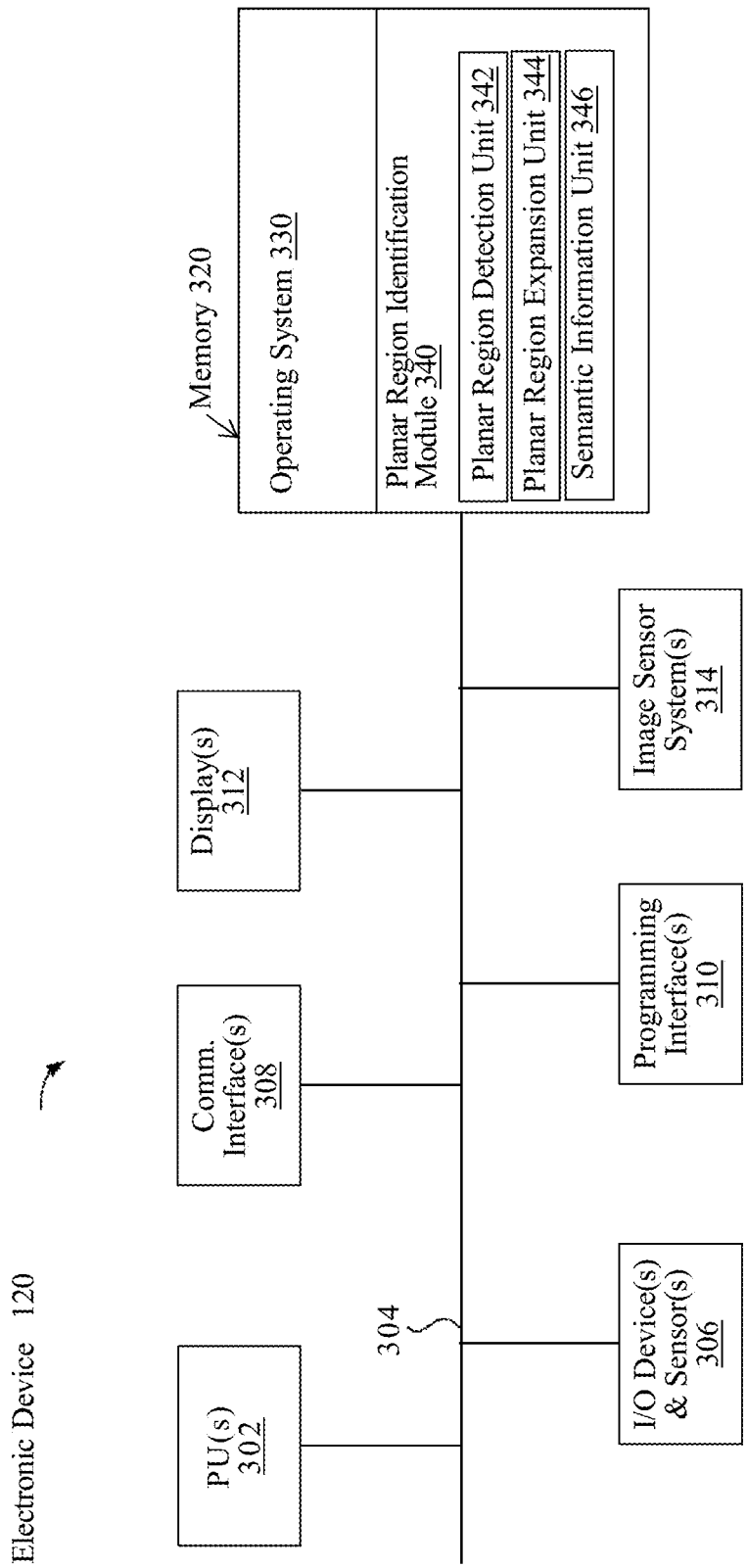
FIG. 3 is a block diagram of an example electronic device in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a hand-held mobile electronic device, other implementations may involve other types of devices including, but not limited to, watches and other wearable electronic devices, mobile devices, laptops, desktops, gaming devices, head mounted devices (HMDs), home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment. A physical environment refers to a physical world that people can sense and/or interact with without aid of electronic systems. The physical environment may include physical features such as a physical surface or a physical object. For example, a physical environment may correspond to a physical park that includes physical trees, physical buildings, and physical people. People can directly sense and/or interact with the physical environment, such as through sight, touch, hearing, taste, and smell.

In some implementations, the controller 110 is configured to create, detect, or use visual markers or to manage and coordinate a extended reality (XR) environment for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the controller 110 and the electronic device 120 are configured to create, detect, or use visual markers or to present the XR environment to the user together.

In some implementations, the electronic device 120 is configured to create, detect, or use visual markers or to present the XR environment to the user. In some implementations, the electronic device 120 includes a suitable combination of software, firmware, or hardware. The electronic device 120 is described in greater detail below with respect to FIG. 3. In some implementations, the functionalities of the controller 110 are provided by or combined with the electronic device 120, for example, in the case of an electronic device that functions as a stand-alone unit.

According to some implementations, the electronic device 120 presents a XR environment to the user while the user is present within the physical environment 105. An extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to characteristic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display.

The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a planar region identification module 240.

The operating system 230 includes procedures for handling various basic system services and for performing hardware dependent tasks.

In some implementations, the planar region identification module 240 is configured to identify, share, or manage planar region information. In some implementations, the planar region identification module 240 includes a planar region detection unit 242, a planar region expansion unit 244, and a semantic information unit 246. The planar region detection unit 242 is configured to detect candidate planar regions in sparse depth sensor array data. The planar region expansion unit 244 is configured to expand candidate planar regions in using configuration information for the sparse depth sensor array data. The semantic information unit 246 is configured to modify planar regions in the sparse depth sensor array data using semantic data obtained from corresponding visual data of the physical environment.

The planar region identification module 240 may be used to create planar regions that are used, for example, by an XR application that is configured to present virtual content (e.g., 3D content) that will be used as part of XR environments for one or more users. For example, the user may view and otherwise experience a XR-based user interface that allows the user to select, place, move, and otherwise experience a XR environment based at least in part on detection and use of a visual marker, for example, via hand gestures, voice commands, input device inputs, etc.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations.

While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an XR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a planar region identification module 340.

The operating system 330 includes procedures for handling various basic system services and for performing hardware dependent tasks.

In some implementations, the planar region identification module 340 is configured to identify, share, or manage planar region information. In some implementations, the planar region identification module 340 includes a planar region detection unit 342, a planar region expansion unit 344, and a semantic information unit 346. The planar region detection unit 342 is configured to detect candidate planar regions in sparse depth sensor array data. The planar region expansion unit 344 is configured to expand candidate planar regions in using configuration information for the sparse depth sensor array data. The semantic information unit 346 is configured to modify planar regions in the sparse depth sensor array data using semantic data obtained from corresponding visual data of the physical environment.

The planar region identification module 340 may be used to create planar regions that are used, for example, by an XR application that is configured to present virtual content (e.g., 3D content) that will be used as part of XR environments for one or more users. For example, the user may view and otherwise experience an XR-based user interface that allows the user to select, place, move, and otherwise experience an XR environment based at least in part on detection and use of a visual marker, for example, via hand gestures, voice commands, input device inputs, etc.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Various implementations disclosed herein include devices, systems, and methods that detect a planar region in a physical environment using depth points from multiple depth sensors (e.g., in a known configuration) by identifying a subset of the depth points based on the depth points being from neighboring depth sensors in accordance with some implementations. In some implementations, electronic devices have registered or co-located image sensor and sparse depth sensors. In some implementations, the sparse depth data is used to identify candidate planar regions (e.g., polygon) that can be expanded by region growing to identify expanded groupings that are likely part of the same planar surface. Semantic segmentation is obtained (e.g., performed) on an image from the corresponding image sensor that was captured at the same or similar time. In some implementations, the plane estimate from the sparse depth sensor is combined with the semantic segmentation (e.g., overlapping semantic information) to crop erroneous parts of the plane estimate which are a result of the depth measurements from the sparse depth sensors being too far apart.

Figure 4:
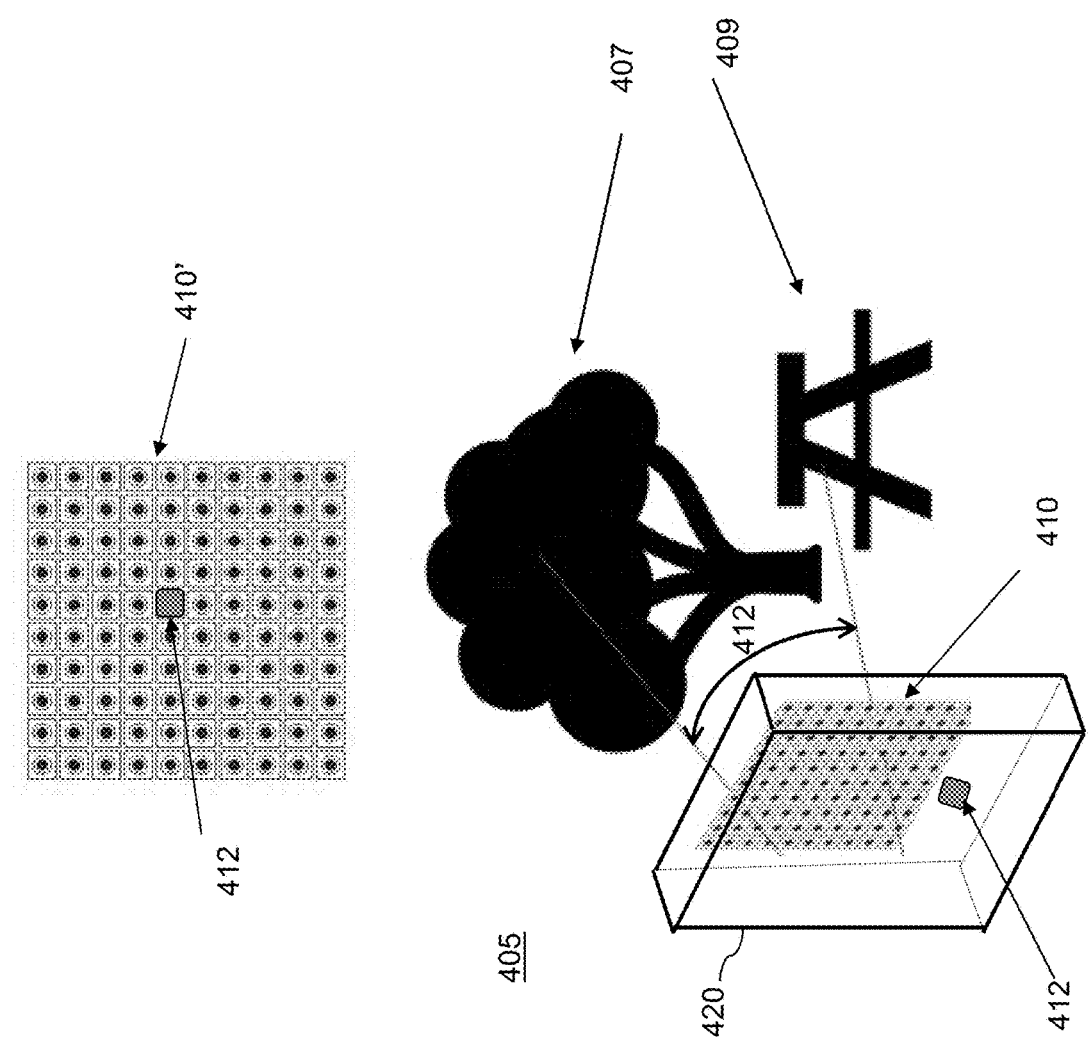
FIG. 4 is a block diagram illustrating an electronic device capturing an image of a physical environment in accordance with some implementations.

FIG. 4 is a block diagram illustrating an electronic device capturing a representation of a physical environment in accordance with some implementations. As shown in FIG. 4, an electronic device 420 includes an image sensor such as RGB camera 412 that captures images and 2D depth sensor array 410 that captures depth measurements of a physical environment 405. The physical environment 405 includes a tree 407 and a table 409. The 2D depth sensor array 410 measure distances to objects in the physical environment 405, and concurrently, or at a similar time or orientation, the RGB camera 412 takes image of the physical environment 405. In some implementations, the RGB camera 412 and 2D depth sensor array 410 are aligned or registered. In some implementations, the RGB camera 412 and 2D depth sensor array 410 have a corresponding field of view (FOV) 414. In some implementations, at least a portion of images from the RGB camera 412 and depth measurements from the 2D depth sensor array 410 overlap. As also shown in FIG. 4, the RGB camera 412 and is co-located with a 2D depth sensor array 410' in some implementations. In some implementations, the electronic device 420 is a device such as the controller 100 or the electronic device 120 of FIGS. 1-3, or a mobile electronic device.

In some implementations, a single capture by sensors of the electronic device 420 is used. In some implementations, multiple captures by sensors of the electronic device 420 is used. In some implementations, the single capture means a set of points from all the depth sensors and a single RGB image is captured at the same time (e.g., or a similar time). In some implementations, after the single capture, the electronic device 420 or the 2D depth sensor array 410 produces an array of 2D depth points. In some implementations, after the single capture, the electronic device 420 produces the array of 2D depth points on or correlated to an image from the RGB camera 412 using the known alignment (e.g., FOV) between the sensors. In some implementations, each point in the correlated image includes a image depth value that is used with the corresponding array of 2D depth points.

FIG. 5A is a block diagram illustrating a 2D depth sensor array capturing distances to portions of a physical environment to produce a grid, a configuration, or a 2D arrangement of depth measurements that corresponds to the physical arrangement of the multiple depth sensors in the 2D depth sensor array in accordance with some implementations. As shown in FIG. 5A, the 2D depth sensor array 410 captures distances to portions of a physical environment to produce a grid, a configuration, or a 2D arrangement 450 of depth measurements $451_1$, $451_2$, ... $451_{100}$ in accordance with some implementations. As shown in FIG. 5A, the depth measurements $451_1$, $451_2$, ... $451_{100}$ may overlay an image 480 from the RGB camera 412.

Figure 5B:
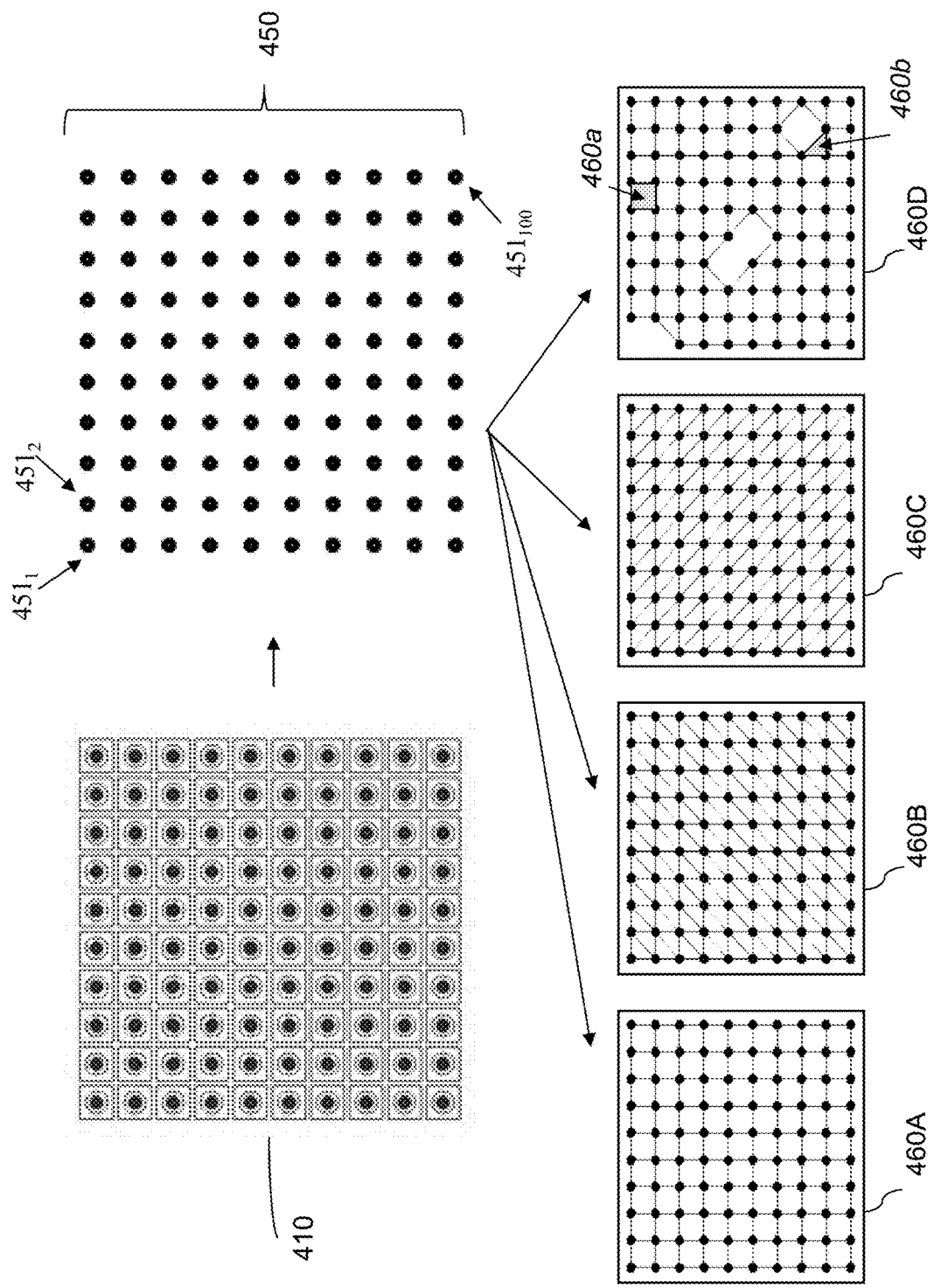
FIG. 5B is a block diagram illustrating example neighborhood formed in a 2D arrangement of depth measurements that corresponds to the physical arrangement of the multiple depth sensors in accordance with some implementations.

FIG. 5B is a block diagram illustrating example neighborhood formed in a 2D arrangement of depth measurements that corresponds to the physical arrangement of the multiple depth sensors in accordance with some implementations. In some implementations, plane estimation starts from finding possible plane hypotheses (e.g., candidate planar regions) from the 2D arrangement 450 of depth measurements $451_1$, $451_2$, ... $451_{100}$. In some implementations, a neighborhood of connections is selected from the 2D arrangement 450. In some implementations, neighborhood connections can be formed as a grid, or polygonal mesh (e.g., triangular or rectangular), or combination of polygonal types.

In some implementations, neighborhood connections are formed from a polygon of depth measurements $451_1$, $451_2$, ... $451_{100}$ in which there is no internal depth measurement (e.g., forming a triangle of depth measurements with no other depth measurements in the interior of the triangle). Non-limiting example local neighborhood connections 460A, 460B, 460C and 460D are shown in FIG. 5B.

In some implementations, the combination model (e.g., 460D) is used when depth points are missing from the array of 2D points 450. For example, a missed depth point may be caused by an object is too far away (e.g., from 2D depth sensor array 410), one or more measurements of the depth measurements $451_1$, $451_2$, ... $451_{100}$ is inconsistent, or high noise levels in the depth measurements $451_1$, $451_2$, ... $451_{100}$.

In one example implementation, the local neighborhood connections can be built from the quad-based mixture model (e.g., 460D).

For each 2D image point $p_{i,j}$ in a grid $\mathcal{G}$ where i and j are indices in $\mathcal{G}$, define a neighborhood configuration $\mathcal{N} \, p_{i,j}$, which includes $p_{i,j}$ itself.

Each set of points in all the complete shapes of $\mathcal{G}$ create plane hypotheses. Depending on an application, we may consider more or less points.

Examples of $\mathcal{N} \, p_{i,j}$ are given below:
  $\mathcal{N} \, p_{i,j} = \{p_{i,j}, p_{i+1,j}, p_{i,j+1}, p_{i+1,j+1}\}$, 460a
  $\mathcal{N} \, p_{i,j} = \{p_{i+1,j}, p_{i,j+1}, p_{i+1,j+1}\}$, which is from an empty point with valid neighbors forming a triangle, 460b

Let's simplify the index (i,j) to i.

From the depth, each $p_i$ can be mapped to the corresponding 3D point $P_i$

For each $\mathcal{N}_{pi}$, computes a planar model $\pi_i$ using all points in $\mathcal{N}_{pi}$, as:

$$A_i = \sum_{\forall j \in \mathcal{N}_{p_i}} (P_j - \mu_i) \cdot (P_j - \mu_i)^T, \quad (1)$$

where $\mu_i$ is the mean of all $P_j$.

The normal of the planar model is the least significant singular vector of the correlation matrix $A_i$.

Skip creating a model if one or more of following criteria meets.
  The ratio between the most and second most significant singular values is less than a certain threshold.
  The ratio between the second most and least significant singular values is less than a certain threshold.

The distance $d_i$ from the sensor's camera center to the plane is $n_i^T \cdot \mu_i$.

In some implementations, the sparse depth sensor configuration (e.g., 2D depth sensor array 410) provides a configuration of data points with known spatial relationships (e.g., depth measurements $451_1$, $451_2$, ... $451_{100}$). In some implementations because the spatial relationship of the sparse depth sensor configuration is known, the randomness of estimated planar regions in a representation of the physical environment 405 (e.g., a 3D point cloud, SLAM, etc.) is reduced or removed. In some implementations, the sparse depth sensor configuration (e.g., 2D depth sensor array 410) are equally spaced apart from one another. In some implementations, the sparse depth sensor configuration (e.g., 2D depth sensor array 410) are irregularly spaced apart from one another. In some implementations, the number of sparse depth sensors in the 2D depth sensor array 410 is small such as 25 (e.g., 5×5), 100 (e.g., 10×10, 4×25, etc.), or 225 (15×15, 9×25). In some implementations, the 2D depth sensor array 410 is arranged in multiple tiers of depth sensors. In some implementations, the 2D depth sensor array 410 has a first subset of depth sensors arranged at a first height on the electronic device 420 and a second subset of depth sensors arranged at a second different height on the electronic device 420. In some implementations, the 2D depth sensor array 410 is not arranged in a contiguous configuration.

In some implementations, once the neighborhood shape (e.g., connections) is selected in the depth measurements $451_1$, $451_2$, ... $451_{100}$, and the planar models are computed, candidate planar regions are determined that satisfy criteria (e.g., distance or orientation). In some implementations, the candidate planar regions are initiated by region growing from the computed planar models. In some implementations, planar region growing from candidate planar regions use region growing criteria (e.g., distance or normal vector). In some implementations, the region growing criteria can be switched depending on an application or situation in which the sparse depth sensor array measurements were obtained.

In some implementations, candidate planar region growing techniques are point-wise region growing techniques. In some implementations, candidate planar region growing techniques are cell-wise region growing techniques. In some implementations, candidate planar region growing techniques evaluate (e.g., must satisfy both) with both point-wise region growing techniques and cell-wise region growing techniques. In some implementations, candidate planar region growing techniques evaluate with a combination of point-wise and cell-wise region growing techniques. In some implementations, the planar region growing techniques identify a seed point. In some implementations, the seed point is a polygon or computed model of FIG. 5. In some implementations, inliers are neighboring depth measurements that satisfy point-wise region growing criteria, cell-wise region growing criteria, or other region growing criteria. In some implementations, the region growing algorithms can evaluate inliers based on the known configuration (e.g., neighbors) of the depth measurements (e.g., depth measurements $451_1, 451_2, \ldots 451_{100}$). In some implementations, an inlier threshold is an indication of how likely the point or cell being evaluated (e.g., adjacent) is in the same plane as the candidate planar region.

FIG. 6A is a diagram that shows an example point-wise growing of a candidate planar region in accordance with some implementations. As shown in FIG. 6A, a seed is a rectangular polygon 610 and 8 point-wise directions $611_1, 611_2, \ldots 611_8$ can be evaluated for adding inliers to the candidate planar region 610. In FIG. 6A, an inlier threshold is based on a distance measurement between the candidate planar region and a next inlier point being evaluated. In some implementations, the inlier threshold fails because the inlier point being evaluated is too far away although in the same plane. In some implementations, the inlier threshold fails because the inlier point being evaluated is too far away from the plane of the candidate planar region. In some implementations, a confidence value received with each depth measurement is used to weight or modify the inlier threshold.

FIG. 6B is a diagram that shows an example cell-wise growing of a candidate planar region in accordance with some implementations. As shown in FIG. 6B, a seed is a rectangular polygon 620 and 4 cell-regions $621_1, 621_2, \ldots, 621_4$ can be evaluated for adding inliers to the candidate planar region 620. In FIG. 6B, an inlier threshold is based on a distance measurement, a normal vector measurement, or a combination of both between the candidate planar region and a next inlier cell being evaluated. In some implementations, the inlier threshold fails because the inlier cell-region $621_1, 621_2, \ldots, 621_4$ being evaluated has 1 or 2 points too far away although in the same plane. In some implementations, the inlier threshold fails because the inlier cell-region $621_1, 621_2, \ldots, 621_4$ being evaluated has 1 or 2 points too far away from the plane of the candidate planar region. In some implementations, the inlier threshold fails because the inlier cell-region $621_1, 621_2, \ldots, 621_4$ being evaluated has a single center point $622_1, 622_2, \ldots, 622_4$ that fails the distance measurement for the inlier threshold. In some implementations, the inlier threshold fails because the inlier cell-region $621_1, 621_2, \ldots, 621_4$ being evaluated has a single center point $622_1, 622_2, \ldots, 622_4$ that fails the normal vector measurement for the cell-wise inlier threshold. In some implementations, a confidence value received with each depth measurement is used to weight or modify each inlier threshold for the cell-wise growing of the candidate planar region.

In some implementations, inlier thresholds can be computed in various ways for point-wise growing of a candidate planar region or cell-wise growing of the candidate planar region. In some implementations, inlier thresholds can be computed using other techniques. For example, the inlier threshold can use a predetermined threshold based on known sensor error variations. For another example, the inlier threshold may use a least significant Eigenvalue of the covariance matrix of a hypothesis seed point or cell.

In some implementations, after all candidate planar regions in the depth measurements $451_1, 451_2, \ldots 451_{100}$ have been evaluated, one or more planar regions are selected. In some implementations, planar regions are selected from the candidate planar regions based on size. In some implementations, planar regions are selected from the candidate planar regions based on its number of inliers. In some implementations, planar regions are selected from the candidate planar regions based one or more criteria and confidence values associated with the depth measurements $451_1, 451_2, \ldots 451_{100}$. In some implementations, planar regions are selected from the candidate planar regions based one or more criteria, which are then modified or weighted by confidence values associated with the depth measurements $451_1, 451_2, \ldots 451_{100}$ so that a planar region with high confidence depth measurements may be selected first. In some implementations, the size of the planar regions is based on a number of associated inlier points.

In some implementations, the largest candidate planar region is selected as the first planar region from the candidate planar regions and inliers (points or cells) belonging to the first planar region are removed from the grid or configuration of depth measurements. Then, the second largest candidate planar region is selected as a second planar region and inliers belonging to the second planar region are removed from the grid or configuration of depth measurements. Thus, independent of the region growing method, each point or each cell can belong to at most one selected planar region. In some implementations, planar regions are sequentially selected until a size or number threshold is reached. In some implementations, other techniques to select or determine one or more planar regions from the expanded candidate planar regions may be used.

Figure 7:
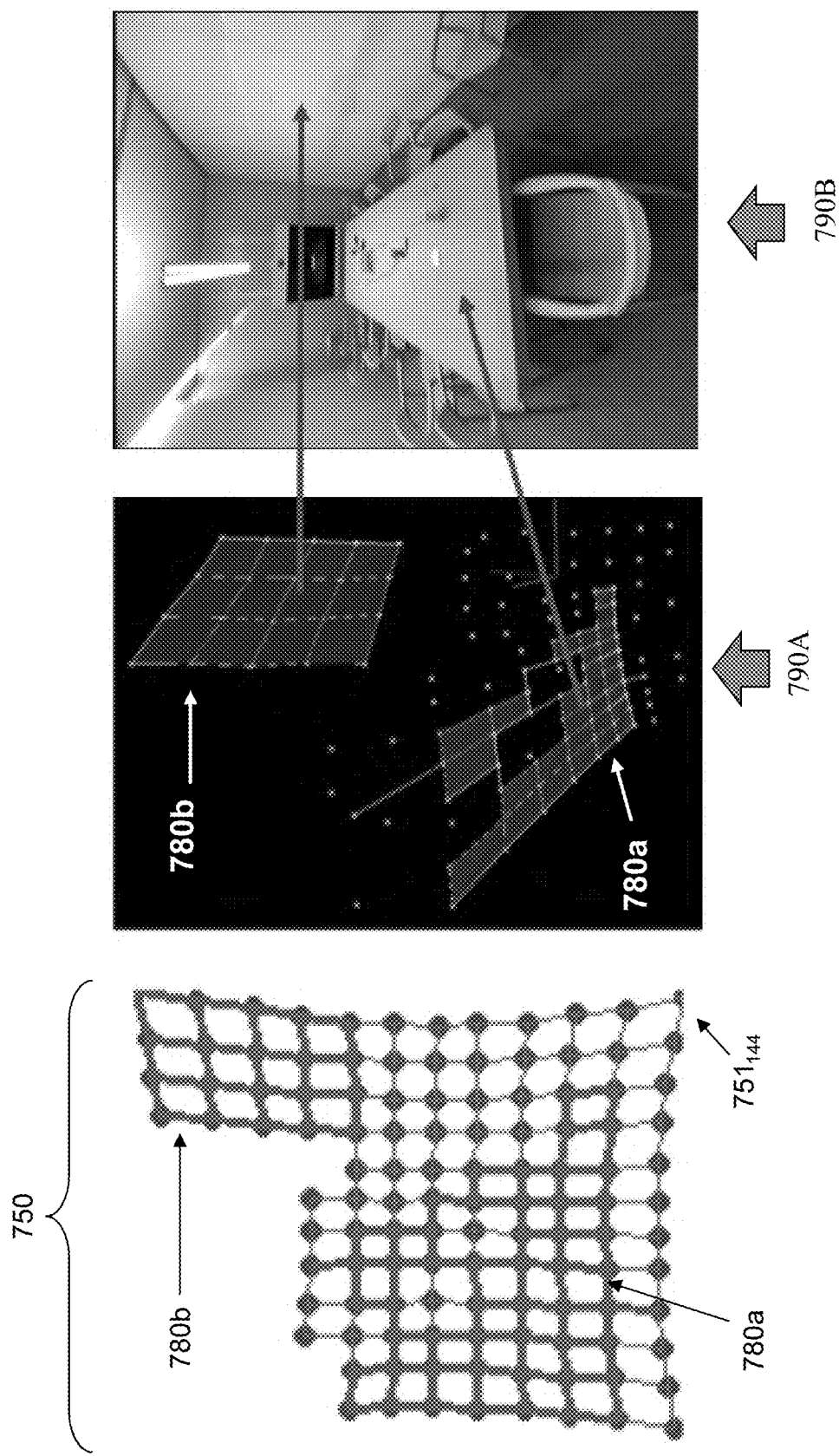
FIG. 7 is a diagram that shows planar regions detected in depth measurements from a sparse arrangement of depth sensors in accordance with some implementations.

FIG. 7 is a diagram that shows planar regions detected in depth measurements from a sparse arrangement of depth sensors in accordance with some implementations. As shown in FIG. 7, a 2D depth sensor array captures distances to portions of a physical environment to produce a 2D arrangement 750 of depth measurements $751_1, 751_2, \ldots 751_{144}$ in accordance with some implementations. As shown in FIG. 7, the 2D arrangement 750 of depth measurements $751_1, 751_2, \ldots 751_{144}$ are generated from a single capture from 12×12 regularly spaced array of sparse depth sensors (not shown) where 115 of the 144 depth measurements were obtained. A first planar region 780a and a second planar region 780b were obtained based on the depth measurements $751_1, 751_2, \ldots 751_{144}$. The first planar region 780a has two holes and the second planar region 780b is continuous.

Image 790A indicates the first planar region 780a and the second planar region 780b mapped into a corresponding 3D image using the 3D values of the depth measurements $751_1$, $751_2$, ... $751_{144}$. Similarly, the image 790B is a camera image of the physical environment. The 3D perspective of the image 790A does not equal the 3D perspective of the image 790B, which causes the warped transformation between the representation of the first planar region 780a in the image 790A to the table top shown in the image 790B and the second planar region 780b in the image 790A to the wall in the image 790B.

In some implementations, machine learning is used to produce semantic information of the physical environment. In some implementations, the semantic information is used to obtain semantic segmentation of the physical environment. In some implementations, the semantic segmentation by the machine learning is able to indicate which pixels in an XR environment belong to corresponding semantics.

In some implementations, the semantic segmentation is used to modify or alter planar regions detected in the physical environment by a sparse depth sensor array (e.g., 2D depth sensor array 410). In some implementations, the planar regions detected in the physical environment by the sparse depth sensor array are combined, divided, cropped, enlarged based on the semantic segmentation. In some implementations, the semantic segmentation is generated from image taken by image sensors such as RGB or RGB-D cameras on an electronic device (e.g., electronic device 420) with the sparse depth sensor array. In some implementations, the semantic segmentation is pre-processing that occurs before planar regions are detected or expanded using the sparse depth sensor array.

Figure 8:
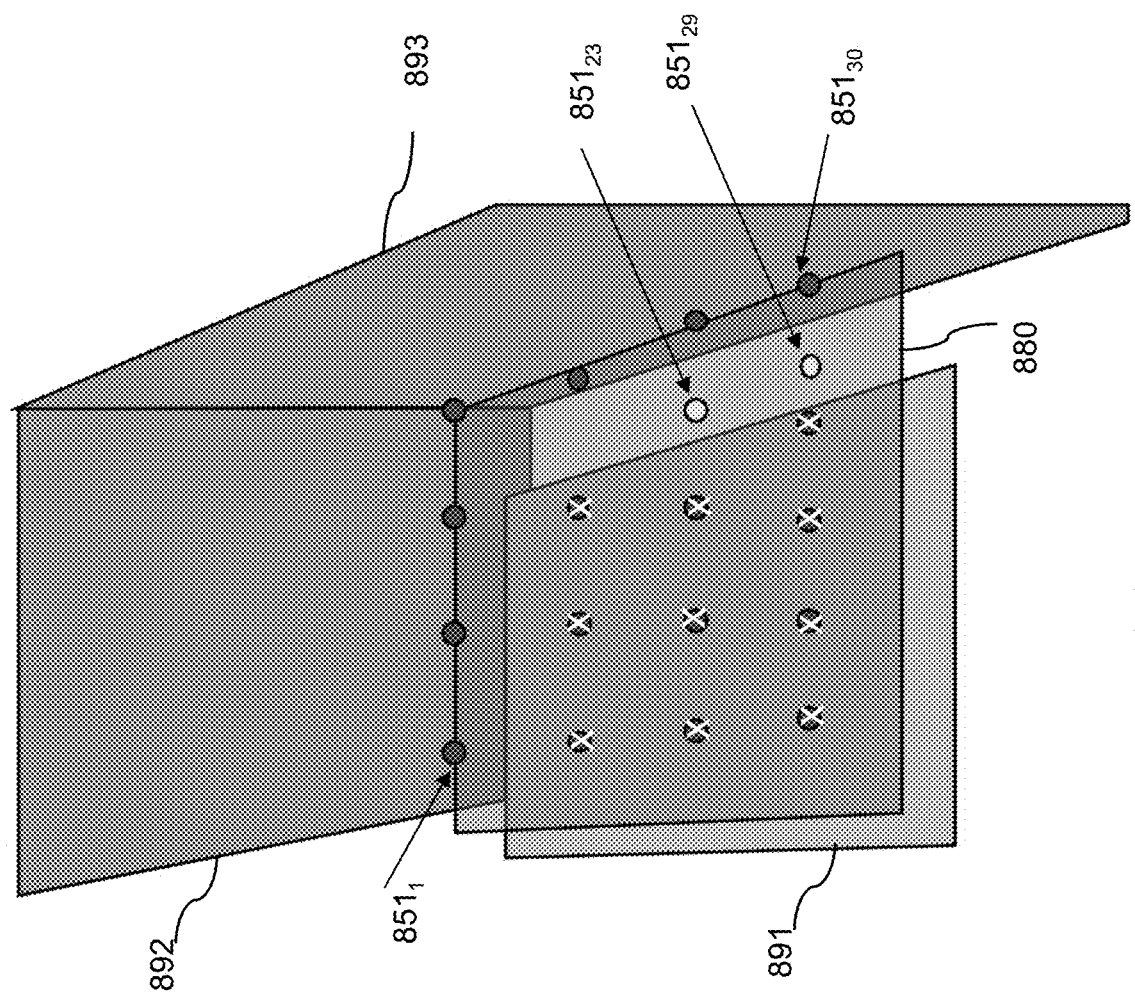
FIG. 8 is a diagram that shows a planar region being altered based on sematic information in accordance with some implementations.

FIG. 8 is a diagram that shows a planar region being altered based on sematic information in accordance with some implementations. As shown in FIG. 8, an example planar region 880 is detected in a physical environment by a sparse depth sensor array (e.g., 2D depth sensor array 410). As shown in FIG. 8, 19 depth measurements were obtained from a single capture by a 5×6 sparse depth sensor array and 17 of the 19 depth measurements $851_1$, $851_2$, ... $851_{30}$ were determined to be in the planar region 880. Depth measurements $851_{23}$ and $851_{29}$, are not included of the planar region 880. As shown in FIG. 8, semantic segmentation identified pixels that belong to table 891, wall 892, and wall 893. Accordingly, the planar region 880' is reduced to 10 of the 19 depth measurements $851_1$, $851_2$, ... $851_{30}$ as shown in FIG. 8 in accordance with some implementations. In this example, depth measurements that were in the same plane as the table 891 but detected on the walls 892, 893 were correctly removed using the sematic information to generate the planar region 880'.

Figure 9:
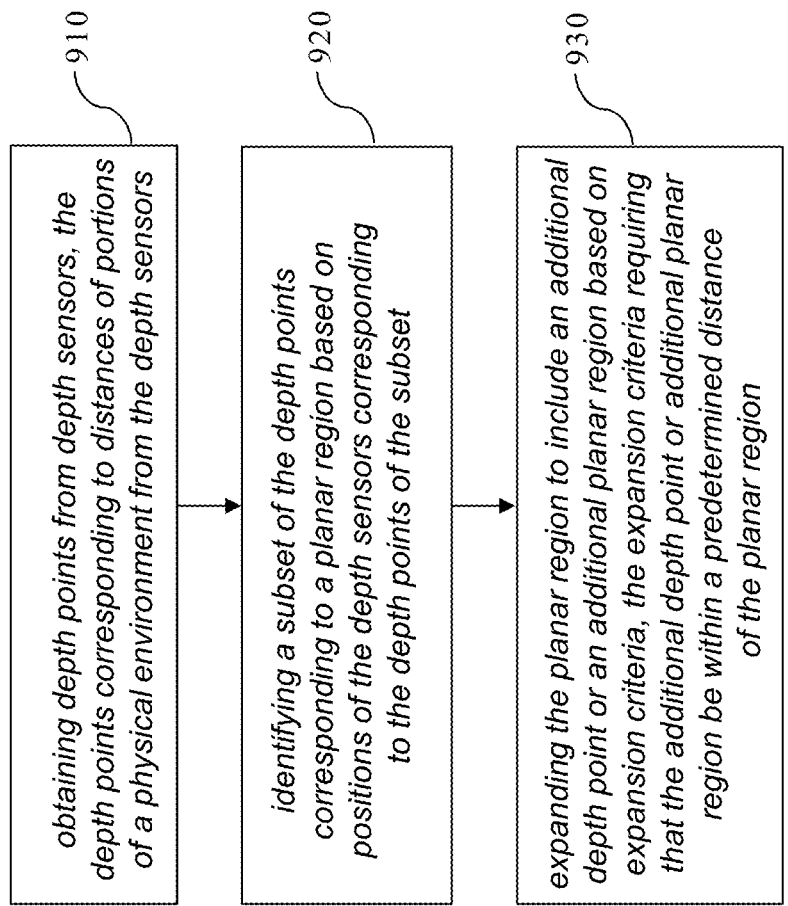
FIG. 9 is a flowchart illustrating an exemplary method 900 for detecting a planar region in a physical environment using depth points from multiple depth sensors by identifying a planar region that includes a subset of the depth points based on the depth points being from neighboring depth sensors in accordance with some implementations.

FIG. 9 is a flowchart illustrating an exemplary method 900 for detecting a planar region in a physical environment using depth points from multiple depth sensors by identifying a planar region that includes a subset of the depth points based on the depth points being from neighboring depth sensors in accordance with some implementations. In some implementations, the multiple depth sensors are a sparse array of depth sensors. In some implementations, the detected planar region is expanded to include additional depth points or additional planar regions based on criteria (e.g., distance, orientation, confidence, or other criteria). In some implementations, the detected planar region is modified based on semantic data from image(s) of the physical environment. In some implementations, the method 900 is performed by a device (e.g., controller 100 or electronic device 120 of FIGS. 1-3). The method 900 can be performed using an electronic device or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 obtains depth points from depth sensors that correspond to distances of portions of a physical environment from the depth sensors. In some implementations, the depth sensors are positioned in a known configuration. In some implementations, the depth sensors are positioned on an electronic device at known locations relative to one another. In some implementations, the known configuration of the depth sensors provides a set of sparse depth points that each have a known neighborhood of depth points (e.g., immediately adjacent or nearby). In some implementations, the known configuration of the depth sensors is a 2D arrangement of depth sensors. In some implementations, the known configuration of the depth sensors is a 3D arrangement of depth sensors. In some implementations, the known configuration of the depth sensors is a regularly spaced 2D grid. For example, the depth sensors can be a 10 by 10 matrix of 100 depth sensors arranged in four groups.

At block 920, the method 900 identifies a subset of the depth points corresponding to a planar region based on positions of the depth sensors corresponding to the depth points of the subset. In some implementations, one or more candidate planar regions are identified based on the depth points being from neighboring sensors in a grid of depth sensors. In some implementations, the neighboring sensors in the grid of depth sensors are determined based on a polygonal shape(s). In some implementations, the neighboring sensors in the grid of depth sensors form repeated shapes (e.g., triangles, squares, rectangles, diamonds, etc.). In some implementations, the candidate planar regions each include a threshold or a minimum number of points. In some implementations, identifying the set of depth points includes identifying three or more depth points in a same neighborhood that form a polygon (e.g., rectangle, triangle, pentagon, etc.) of depth points with no other depth points in the interior of the polygon.

At block 930, the method 900 expands the planar region to include an additional depth point or an additional planar region based on expansion criteria. In some implementations, the expansion criteria determine that the additional depth point or additional planar region is within a predetermined distance of the planar region. In some implementations, the expansion criteria may require that the additional depth point or additional planar region have a normal vector that is similar (e.g., within a threshold angle difference) to the planar region's normal vector. In some implementations, the planar region is expanded using point-wise region growing techniques or cell-wise region growing techniques.

In some implementations, the expansion criteria may require that a center point of the additional planar region be within a predetermined distance of the planar region. In some implementations, the expansion criteria may require that at least one corner point of the additional planar region be within a predetermined distance of the planar region. In some implementations, expanding the planar region based on expansion criteria is further based on a depth confidence value of the sparse depth points.

In some implementations, the planar region is modified based on semantic information from a light intensity image or frame of the physical environment. In some implementations, the image sensor senses the portions of the physical environment corresponding to the sparse depth sensors. In some implementations, an image sensor(s) such as an RGB sensor is co-located with the depth sensors. In some implementations, the image sensor is used to determine semantic data about the portions of the physical environment. For example, the planar region may be modified by overlapping the planar region with semantic segmentation to add/crop/combine/separate erroneous parts of the planar region that result from the depth measurements being too far apart (e.g., sparse depth sensor array).

In some implementations, the method 900 further refines the expanded planar region based on additional depth points (e.g., later in time) from the depth sensors that correspond to additional distances of the portions of the physical environment from the depth sensors. In some implementations, the expanded planar region may be refined based on additional semantic information obtained from the corresponding image sensor at the same or similar time as the additional depth points.

Thus, in some implementations, the method 900 further includes obtaining a second set of depth points from the depth sensors that correspond to distances of second portions of the physical environment from the depth sensors and identifying a second subset of the depth points corresponding to a second planar region based on the positions of the depth sensors corresponding to the depth points of the second subset of the depth points. Then, the method 900 expands the second planar region to include an additional depth point or an additional planar region that is within the predetermined distance of the second planar region. The method 900 may further modify the second planar region based on semantic information from a second light intensity (e.g., RGB) image of the physical environment obtained from the co-located image sensor. Then, the method 900 may further combine data from the second planar region with data from the expanded planar region. For example, the expanded planar region may be modified based on the second planar region (e.g., with subsequent sets of depth points from the depth sensors), wherein at least a portion of the second planar region overlaps the expanded planar region.

In some implementations, an image of the physical environment that includes the visual marker at a deployed location is obtained using a sensor (e.g., image sensor, camera) on an electronic device having a processor. In some implementations, the image is a 2D image or a 3D image. In some implementations, combinations of image sensors are used. In some implementations, color images can be used. Alternatively, in some implementations, grayscale images can be used. In some implementations, images of the physical environment are used to generate an XR environment representing the physical environment. In some implementations, the XR environment is generated using VIO or SLAM position tracking or the like at the electronic device.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
   at an electronic device having a processor:
      obtaining depth points from depth sensors, the depth points corresponding to distances of portions of a physical environment from the depth sensors;
      identifying a subset of the depth points corresponding to a planar region based on positions of the depth sensors corresponding to the depth points of the subset; and
      expanding the planar region to include an additional depth point or an additional planar region based on expansion criteria used to determine that the additional depth point or the additional planar region are on a same plane as the planar region, the expansion criteria requiring that the additional depth point or the additional planar region be within a predetermined distance of the planar region.

2. The method of claim 1, wherein the depth sensors are positioned at known locations relative to one another, and wherein identifying the subset of depth points comprises identifying a plurality of depth points in a same neighborhood based on the known locations of the depth points relative to one another.

3. The method of claim 1, wherein the depth sensors are positioned in a known configuration to provide the depth points in a regularly-spaced grid.

4. The method of claim 2, wherein identifying the subset of depth points comprises identifying three depth points in a same neighborhood, the subset of depth points forming a triangle of depth points with no other depth points in the interior of the triangle.

5. The method of claim 2, wherein identifying the subset of depth points comprises:
   generating a grid of the depth points;
   selecting sets of depth points within the grid based on the locations of the depth points of the grid; and
   identifying the sets of depth points as planar regions based on values of the depth points.

6. The method of claim 1, wherein the expansion criteria requires that the additional depth point be within a first predetermined distance in a plane of the planar region or within a second predetermined distance orthogonal to the plane of the planar region.

7. The method of claim 1, wherein the expansion criteria requires that the additional depth point have a normal that is within a threshold angle difference of a normal of the planar region.

8. The method of claim 1, wherein the expansion criteria requires that a point of the additional planar region be within a predetermined distance of the planar region.

9. The method of claim 1, wherein the expansion criteria requires that the additional planar region have a normal that is within a threshold angle difference of a normal of the planar region.

10. The method of claim 1, wherein expanding the planar region based on expansion criteria is further based on a depth confidence value of the additional depth point or the additional planar region.

11. The method of claim 1 further comprising modifying the planar region based on semantic information from a light intensity image of the physical environment, wherein the light intensity image is obtained from an image sensor co-located with the depth sensors.

12. The method of claim 11, wherein said modifying the planar region comprises removing a portion of the planar region based on the portion of the planar region having different semantic information than a remainder of the planar region.

13. The method of claim 1 further comprising:
   obtaining second depth points from the depth sensors, the second depth points corresponding to distances of second portions of the physical environment from the depth sensors;
   identifying a second subset of the second depth points corresponding to a second planar region based on the positions of the depth sensors corresponding to the second depth points of the second subset; and
   expanding the second planar region to include a second depth point of the second depth points or a second planar region of the second depth points that is within the predetermined distance of the second planar region.

14. The method of claim 13, further comprising modifying the second planar region based on semantic information from a second light intensity image of the physical environment obtained from a corresponding image sensor.

15. The method of claim 13, further comprising combining data from the second planar region with data from the planar region.

16. The method of claim 13, further comprising modifying the planar region based on the second planar region, wherein at least a portion of the second planar region overlaps the planar region.

17. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
      obtaining depth points from depth sensors, the depth points corresponding to distances of portions of a physical environment from the depth sensors;

identifying a subset of the depth points corresponding to a planar region based on positions of the depth sensors corresponding to the depth points of the subset; and expanding the planar region to include an additional depth point or an additional planar region based on expansion criteria used to determine that the additional depth point or the additional planar region are on a same plane as the planar region, the expansion criteria requiring that the additional depth point or the additional planar region be within a predetermined distance of the planar region.

18. The system of claim 17, wherein the depth sensors are positioned at known locations relative to one another, and wherein identifying the subset of depth points comprises identifying a plurality of depth points in a same neighborhood based on the known locations of the depth points relative to one another.

19. The system of claim 17, wherein the depth sensors are positioned in a known configuration to provide the depth points in a regularly-spaced grid.

20. A non-transitory computer-readable storage medium, storing program instructions computer-executable on a computer to perform operations comprising:

at an electronic device having a processor:

obtaining depth points from depth sensors, the depth points corresponding to distances of portions of a physical environment from the depth sensors;

identifying a subset of the depth points corresponding to a planar region based on positions of the depth sensors corresponding to the depth points of the subset; and expanding the planar region to include an additional depth point or an additional planar region based on expansion criteria used to determine that the additional depth point or the additional planar region are on a same plane as the planar region, the expansion criteria requiring that the additional depth point or the additional planar region be within a predetermined distance of the planar region.

\* \* \* \* \*